United States Patent
Razdan et al.

(10) Patent No.: US 8,019,347 B2
(45) Date of Patent: Sep. 13, 2011

(54) METHOD AND APPARATUS FOR RAN ASSISTED LOCATION UPDATE

(75) Inventors: Ashu Razdan, San Diego, CA (US); Harleen Gill, San Diego, CA (US); Eric C. Rosen, Solana Beach, CA (US)

(73) Assignee: Qualcomm Incorporated, San Diego, CA (US)

( * ) Notice: Subject to any disclaimer, the term of this patent is extended or adjusted under 35 U.S.C. 154(b) by 965 days.

(21) Appl. No.: 11/943,822

(22) Filed: Nov. 21, 2007

(65) Prior Publication Data
US 2009/0131072 A1    May 21, 2009

(51) Int. Cl.
*H04W 88/02* (2009.01)
(52) U.S. Cl. .......................................... 455/440
(58) Field of Classification Search .......... 455/436–444, 455/456.5
See application file for complete search history.

(56) References Cited

U.S. PATENT DOCUMENTS

| | | |
|---|---|---|
| 2003/0153343 A1 | 8/2003 | Crockett et al. |
| 2004/0018829 A1 * | 1/2004 | Raman et al. ............. 455/406 |
| 2004/0019539 A1 * | 1/2004 | Raman et al. ............. 705/29 |
| 2006/0079244 A1 | 4/2006 | Posner et al. |
| 2007/0237114 A1 * | 10/2007 | Mehta et al. ............. 370/331 |
| 2008/0062955 A1 * | 3/2008 | Gao et al. ............. 370/348 |

FOREIGN PATENT DOCUMENTS

| | | |
|---|---|---|
| EP | 1526749 | 4/2005 |
| EP | 1670268 | 6/2006 |
| EP | 1701575 | 9/2006 |

OTHER PUBLICATIONS

International Search Report, PCT/US2008/083914, International Searching Authority, European Patent Office, Mar. 19, 2009.
Written Opinion, PCT/US2008/083914, International Searching Authority, European Patent Office, Mar. 19, 2009.

* cited by examiner

*Primary Examiner* — Diane Mizrahi
(74) *Attorney, Agent, or Firm* — Raphael Freiwirth

(57) ABSTRACT

An apparatus and method for efficiently updating location information of a mobile device in a wireless communication network, such as a cellular network, is disclosed. The mobile device sends its location information through a route update message to a base station controller. This route update message is sent over the access channel if the traffic channel is not up. When the base station controller realizes the mobile device has changed its location, the base station notifies the change to a location server, which sends a location update message to an application server.

23 Claims, 5 Drawing Sheets

US 8,019,347 B2

METHOD AND APPARATUS FOR RAN ASSISTED LOCATION UPDATE

BACKGROUND OP THE INVENTION

1. Field of the Invention

The invention relates to wireless communications, and more particularly, to locating a wireless device within a wireless telecommunication, system for communication purposes.

2. Description of the Related Art

In wireless telecommunication systems, Push-to-talk (PTT) capabilities are becoming popular with service sectors, PTT can support a "dispatch" voice service that operates over standard commercial wireless infrastructures, such as code division multiple access (CDMA), frequency division multiple access (FDMA), time division multiple access (TDMA), and global system for mobile communications (GSM). In a dispatch model, communication between endpoints (end user devices) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification. In the absence of a wireless multicast channel, each group is formed by the combination of separate point-to-point connections between each endpoint and application server. Each endpoint is also known as a PTT member. Alternatively, when a group is reduced to two members and a PTT call is from one member to another, the PTT call would be a direct call between these two members.

FIG. 1 illustrates a prior art architecture 100 supporting PTT communications. The architecture includes the deployment of a single application server 112 region in conjunction with a carrier's CDMA infrastructure and packet data network. Each region of the application server 112 is deployed over a specific portion of a carrier packet data network ("PTT Regional Network") 110. The application server 112, also known as PTT server, within the region may be routing traffic between one or more Packet Data Service Nodes (PDSNs) 107 in the carrier network (Service Provider Regional Network) 108. A communication device 102 that supports the PTT feature is in communication with a base station controller (BSC) 104, which typically includes a base station (BS). Each BSC 104 may be in communication with one or more base station transceiver (BTS) 114. The BSC 104 is in communication with a high-speed network 106 and PTT communications received from the communication device 102 is sent through the BSC 104 and the high-speed network 106 to a PDSN 107. The BSC 104 may communicate with a package control function (PCF) 105 for processing data packets between the communication between the PDSN 107 and the communication device 102. The PDSN 107 communicates with the high-speed network 106 and an application server's 112 carrier network 108, which is connected to a PTT regional network 110. The PDSN 107 forwards the PTT communications to an application server 112 in the PTT network 110.

The application server 112 handles PTT communications among members of a PTT group. The application server 112 receives a PTT communication from one member and forwards it to all members of the PTT group. The PTT communication is usually received as data packets from the PTT network 110, and the PTT communication sent out by the application server 112 is also in data packet format. A PDSN 107 and a connected BSC 104 established through a BTS 114 have a dedicated traffic channel to transmit the PTT communication to a receiving PTT communication device (a PTT member) 102.

PTT communications are commonly used in public safety and disaster recovery scenarios in which a large number of public safety officers and rescue workers communicate among themselves through PTT communications. One of problems related to call set up for the PTT communications between a large number of users is the latency in during the call set up process.

The call set up involves locating a targeted PTT communication device 102 and allocating resources for each PTT communication and establishing a traffic channel to support each PTT communication. The location of each PTT communication device 102 is commonly tracked through location update messages sent from each PTT communication device 102 through a reverse traffic channel to the application server 112. When there are many simultaneously PTT communications in a small geographical area, such as during a public safety or disaster recovery situation, tracking the location of a plurality of PTT devices through location update messages has an adverse impact on the capacity of the wireless network due to increased resource usage (traffic channels need to be brought up frequently), as well as an increase in the network traffic. Consequently, lowered network capacity leads to additional delays during the call set up process. It is therefore desirous to have the PTT communication system that can easily and efficiently reduce the latency from ongoing location update messages when establishing multiple PTT calls.

SUMMARY OF THE INVENTION

The apparatus and method described herein enables efficient establishment of PTT communications among a plurality of wireless devices. The efficiency is achieved by:
 a. Eliminating the need to set up traffic channel for the transmission of location information from the mobile wireless device to the application server.
 b. Minimizing the size of location updates that are sent over the access channel thereby minimizing any impact to the capacity of common channels.

In one embodiment, there is provided a method for updating location information of a wireless communication device in a wireless communication network over the access channel. Alternatively, in the ease where the wireless device already has a dedicated channel up, the location can be updated over the dedicated data channel. In yet another embodiment, the location may be inferred by handoff related information or the last sector through which a message was received. The method includes receiving a location update message from a wireless communication device capable of push-to-talk (PTT) communication, retrieving from the location message a location information for the wireless communication device, comparing the retrieved location information with a stored location information for the wireless communication device, and if the retrieved location information is different from the stored location information, transmitting the retrieved location information for the wireless communication, device to an application server. This embodiment requires wireless network components (BSC and PDSN) to translate 1xEV-DO route update messages into application layer (as defined in the OSI model) messages which are sent to the application server over the Internet Protocol. It should be noted that the granularity of the location information is a sector, and that any displacement of the wireless device while receiving service from the same sector is not captured in the location updates.

In another embodiment, the apparatus includes a network interface unit for receiving the location information of a transmitting wireless device and transmitting the received location information to the network server, a storage unit for storing a previous location information of the transmitting wireless device, and a controller unit for comparing the received location information with the previous location information and determining whether the transmitting wireless device has moved from one location to another location, the controller further being capable of sending the received location information in a notification of location change message to the network server if the transmitting wireless device has moved from one location to another location.

Other advantages and features of the present invention will become apparent after review of the hereinafter set forth Brief Description of the Drawings, Detailed Description of the Invention, and the Claims.

DETAIL DESCRIPTION OF THE INVENTION

In this description, the terms "communication device," "wireless device," "wireless communications device," "PTT communication device," "handheld device," "mobile device," and "handset" are used interchangeably. The terms "call" and "communication" are also used interchangeably, so are the terms "base station" and "base station server." The term message or location message may refer to an access channel or traffic channel or signaling type data message. The term "application" as used herein is intended to encompass executable and non-executable software files, raw data, aggregated data, patches, and other code segments. The term "exemplary" or "configuration" means that the disclosed element or embodiment is only an example, and does not indicate any preference of user. Further, like numerals refer to like elements throughout the several views, and the articles "a" and "the" includes plural references, unless otherwise specified in the description.

Figure 1:
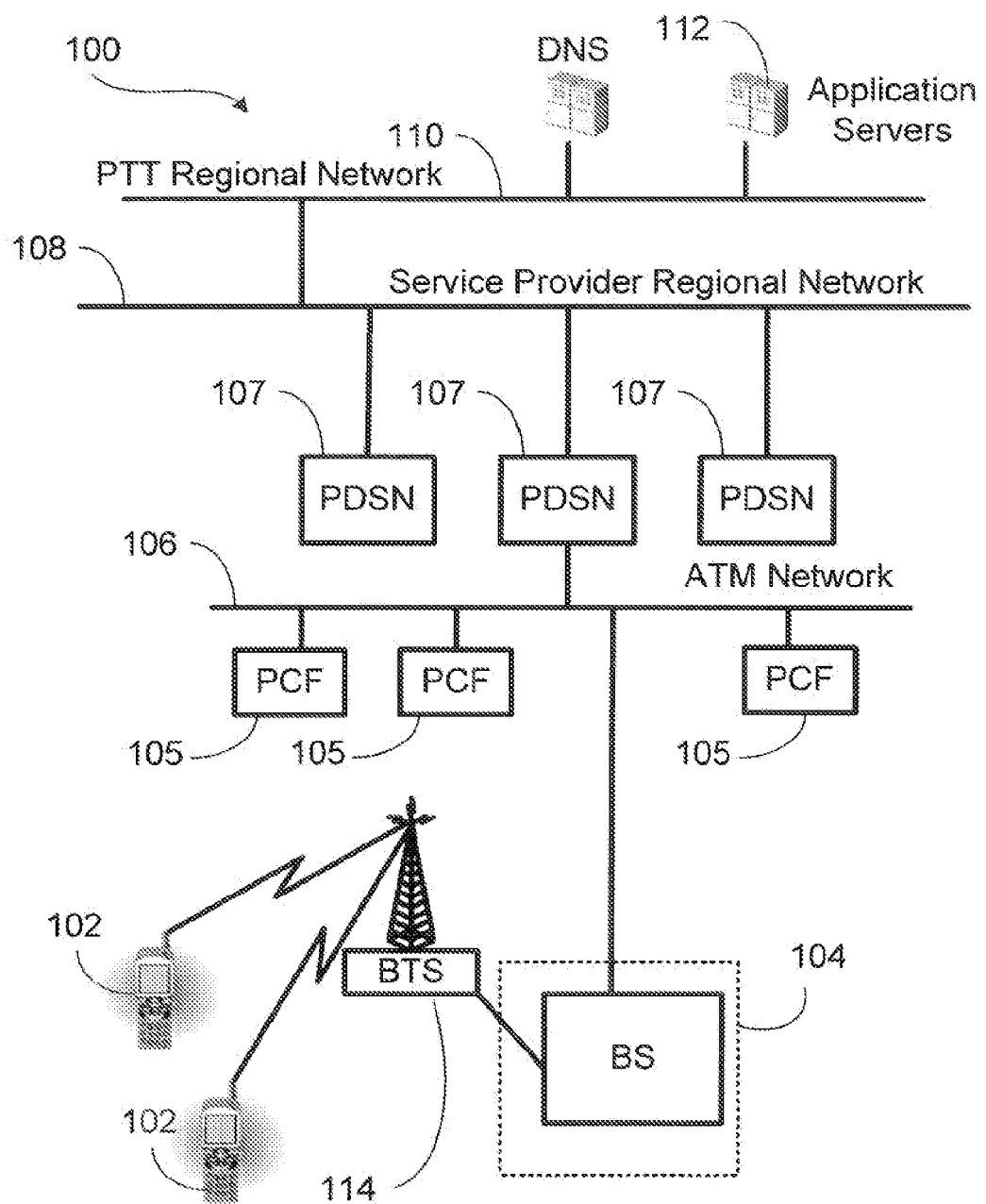
FIG. 1 is a prior art architecture of a wireless communication network.
Figure 2:
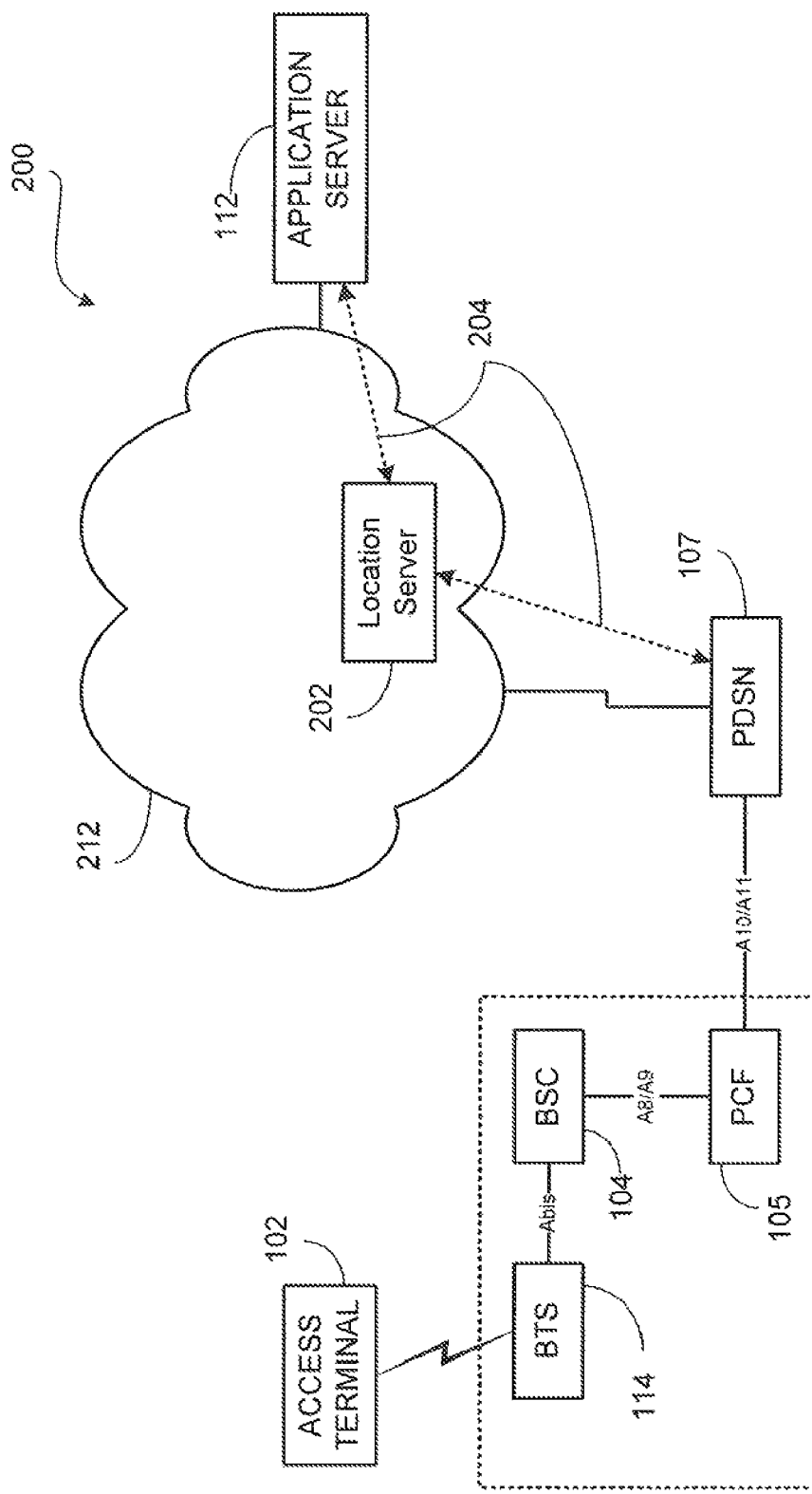
FIG. 2 is an architecture of an exemplary wireless communication network with improved location update of PTT member devices.

In overview, the system and method enables a highly efficient scheme to update the location information of a wireless device by efficiently sending the location information from the wireless device of a PTT group to a location server in communication with an application server. The location of the wireless devices 102 served by an application server 112 is tracked by the location server 202 and FIG. 2 illustrates one configuration of an architecture 200 supporting the present invention. The wireless device 102 communicates with a BTS 114, which is connected to a BSC 104, by transmitting route update messages through the access channel or the traffic channel of a radio access network (wireless access network). The route update messages are used to track the location of wireless device 102 at a sector level and maintain the radio link between the wireless device 102 and the radio access network. The location information can be kept up to date while the wireless device 102 is in traffic. As route update messages are sent over the traffic channel as well, no additional steps are required. The BSC 104 might already be aware of the location of the wireless device 102 as it is exchanging data with it through a set of sectors. However, as the application server 112 needs to be apprised as well, processing the route updates that come in regularly can be equally effective. In the absence of timely reception of the route update messages on traffic channel, the BSC 104 can use other handoff related information, if available. For example, the BSC 104 can use choose the sector through which it last received signaling or data from the wireless device 102.

The BSC 104 tracks the location of the wireless device 102 through route update messages that are received periodically from the wireless device 102 through the access channel or the traffic channel. This periodicity may be time based as well as event based. For instance, the wireless device 102 can update the location information every 't' seconds. Also, the route update can be sent to the BSC 104 whenever the active set (the set of strongest pilot signals) changes. When the wireless device 102, initially located in one sector of a cell area, moves from one covered sector to another covered sector (or alternatively, the active set changes), the BSC 104 may detect such movements through the route update messages received from the wireless device 102 and sends a notice of location change to a PDSN 107. The notice of location change maybe sent, for example, using an A11 signaling message. For instance, the A11 interface and the A10 Connection Setup Airlink Record as specified in the 3GPP2 Interoperability Specification (IOS) for cdma2000 Access Network Interfaces contains a field called BSID (Base station identifier). This field may be used to convey mobility information from the BSC 104 to the PDSN 107.

The PDSN 107 sends a location update message in the Internet Protocol format to a location assist server (LAS) 202. The LAS 202 may be located in a network 212, such as the Internet, or alternatively may be co-located within the PDSN 107. The wireless device 102 generally needs to be registered with the LAS 202, and the LAS 202 tracks the location of the wireless device 102. In one configuration, this registration is required as the LAS 202 needs to know which application server 112 should be notified regarding the location updates for the wireless device 102 in question. In another configuration, the LAS 202 and the application server 112 maybe one combined unit, thus making the communication between the LAS 202 and the application server 112 easier. Other configurations may use other methods as known in the art to determine the application server 112 to be notified. The registration between the wireless device 102 and the LAS 202 can be done through SIP (Session Initiation Protocol) or other similar protocols. The wireless device 102 generally also needs to register the LAS 202 with the PDSN 107, so the PDSN 107 can properly communicate with the LAS 202. In the scenario where the PDSN 107 and the LAS 202 are collocated (the functionality is realized in the same component), this registration is not generally required. If, however, the registration is required, the registration may be done via an extension for A11. The standard allows for critical vendor/organization specific extensions.

In one configuration, after receiving the location update message from the PDSN 107, the LAS 202 updates the location of the wireless device 102 and sends a re-packaged location update message (over Internet Protocol) with additional information retrieved from the LAS 202 for the wireless device 102 to the application server 112. For instance, updating the location information on the application server 112 through location information received by the BSC 104 from the route update messages eliminates the need for the wireless device 102 to send a dedicated location update message directly to the application server 112. There is no need to establish a traffic channel between the wireless device 102 and the BSC 104, although a traffic channel could still be established if desired.

Figure 3:
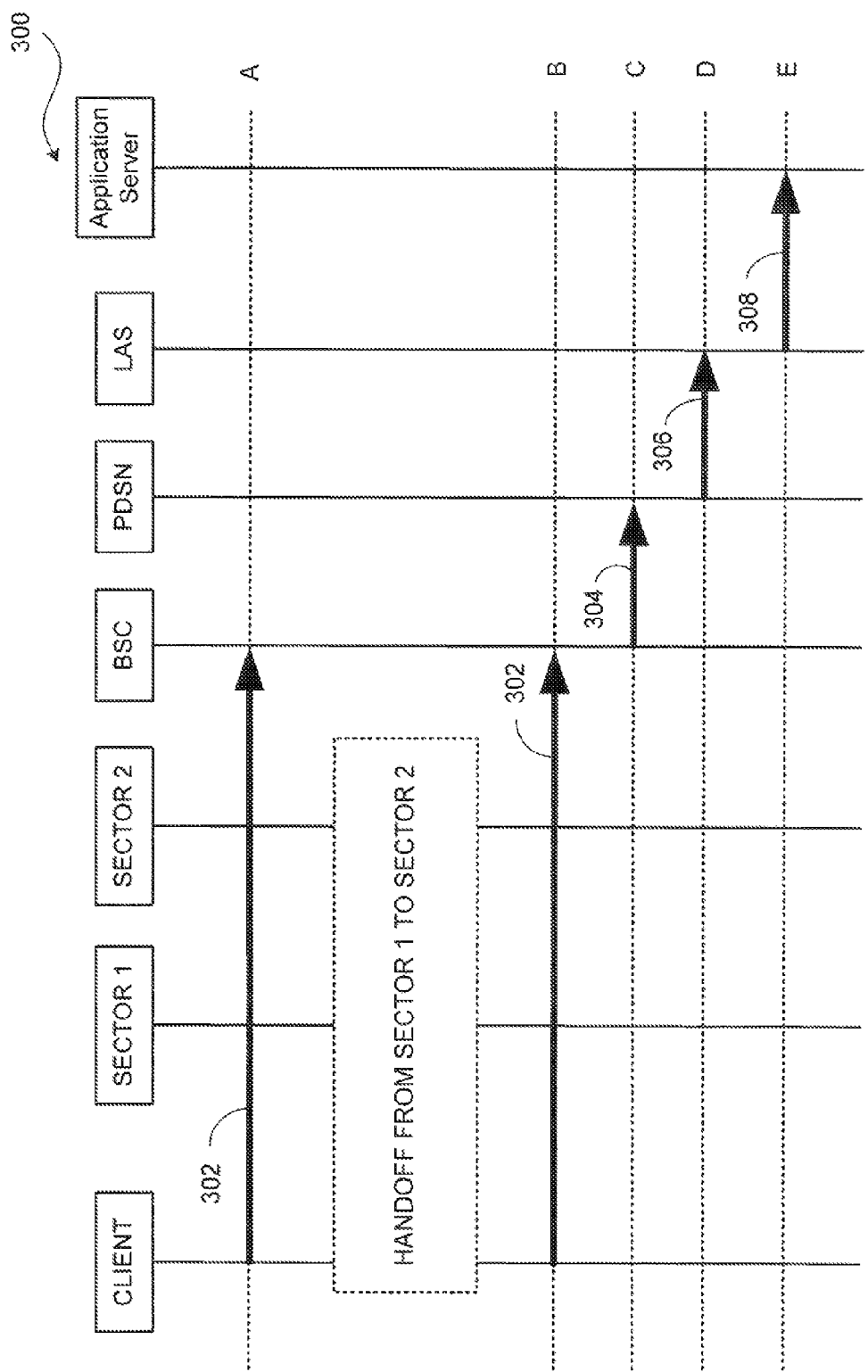
FIG. 3 a message flow chart of a location update in the present invention.

FIG. 3 illustrates a message flowchart 300 for a LAS operation. A wireless device 102 sends messages 302, such as periodic route update messages, to a BSC 104. The network carrier can configure the policy that triggers the route update message using appropriate registration zone boundaries and timers. The wireless device 102 may be located in isolated sectors, or in regions with coverage horn multiple sectors. The BSC 104 can choose to represent these regions using a group of sectors, or can break the tie by selecting the strongest pilot strength as the metric. Through the messages received from the wireless device 102, the BSC 104 determines which sector(s) the wireless device 102 is located. The BSC 104 can choose the serving sector(s) based on the pilot strengths included by the wireless device 102. Alternatively, the BSC 104 can select the sector from which it last received a message that was initiated by the wireless device. This approach could be beneficial in handoff scenarios where the wireless device 102 is in traffic. When the wireless device 102 moves from one sector to another, the information in the messages change such that the BSC 104 can determine the new location of the wireless device 102 through the information embedded in the messages. Upon determination of the location change, the BSC 104 sends a message 304 to the PDSN 107 indicating a location change for the wireless device 102. The PDSN 107 sends a location update message 306 to a LAS 202 with which the wireless device 102 is registered. Finally, the LAS 202 sends a location update message 308 over the Internet to the application server 112.

Figure 4:
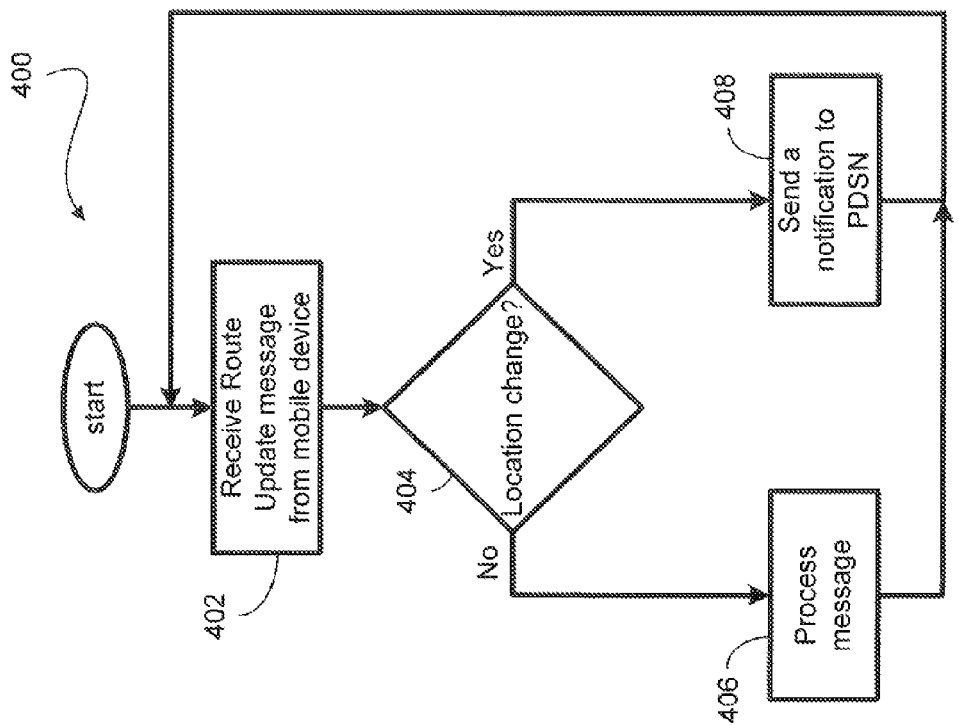
FIG. 4 illustrates an exemplary base station controller process for updating PTT member device location.

FIG. 4 is a flowchart 400 that illustrates one configuration for a BSC process. The BSC 104 maintains contact with a wireless device 102 by sending and receiving messages to and from the wireless device 102. When a route update message is received from the wireless device 102, step 402, the BSC 104 determines, based on the information in the route update message, whether the wireless device 102 has moved to a new location, step 404. If the wireless device 102 has not moved to a new location, the BSC 104 will process the route update message as it usually does, step 406. If the wireless device 102 has changed its location, the BSC 104 will send a location change message to an application server 112 through the PDSN 107, step 408.

Figure 5:
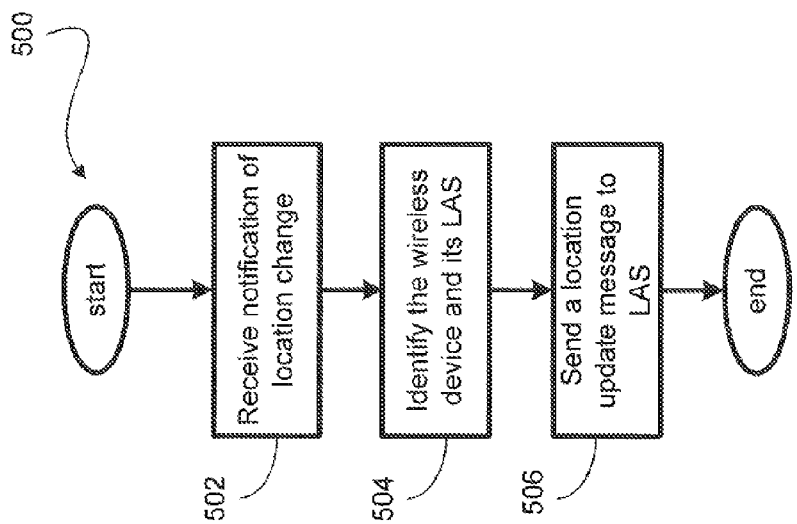
FIG. 5 illustrates an exemplary PDSN process in the present system.

FIG. 5 is a flowchart 500 for an exemplary PDSN process of the present system. When a PDSN 107 receives a notification of location change from a BSC 104, step 502, the PDSN 107 identifies the wireless device 102 and retrieves from a database the information about the LAS 202 associated with the wireless device 102, step 504. After identifying the LAS 202, the PDSN 107 can then send a location update message to the LAS 202, step 506. The PDSN 107 is an end point for the Point-to-Point (PPP) protocol and an interfacing point for PPP packets and IP packets. For instance, the notification of location change arrives in PPP packets and the location update message is sent through IP packets.

Figure 6:
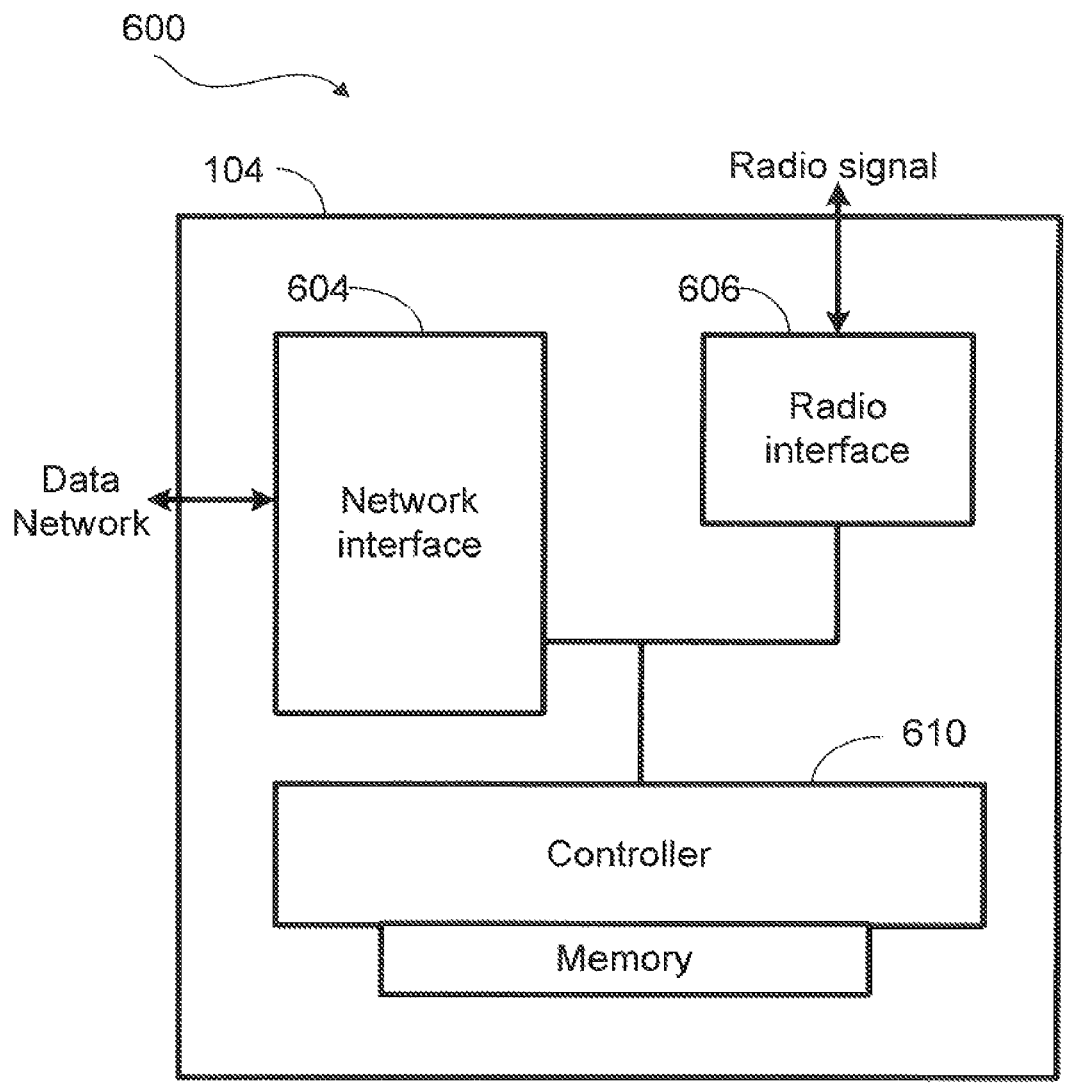
FIG. 6 is a block diagram for one embodiment of a base station controller supporting the present system.

FIG. 6 illustrates a block diagram 600 of a base station 104. The base station 104 receives, through a network interface 604, information related to audio and data calls from an application server 112 and transmits the received information as radio signals through a radio interface 606 to wireless communication devices 102. The base station 104 also receives communications from the wireless communication devices 102 and transmits them to a remote server 112. For example, the base station 104 receives a location change message from a wireless communication device 102. The transmission of communications to the wireless communication devices is through radio signals, and the radio signals may be transmitted in multiple time slots. These time slots are resources that a controller 610 in the base station 104 assigns to each communication. The controller 610 also tracks the position of each wireless device 102. The controller 610 can analyze the messages received from the wireless device 102 and determine if the wireless device 102 has moved to a different sector.

In operation, when a user powers up his wireless device 102, the wireless device 102 registers with an application server 112. The wireless device 102 also registers with a LAS and a PDSN and a PPP session is established between the wireless device 102 and the PDSN 107. The registration may be done out of band after the traffic channel is up. The registration needs to be done once per PPP session and can be done using an open protocol such as Session Initiation Protocol. The information of the LAS 202 is registered on the PDSN 107 using LCP/NCP protocols or by forcing a PPP re-negotiation. The PPP re-negotiation is accomplished by tearing down the old PPP session and establishing a new PPP session. While the wireless device 102 is idle, the wireless device 102 continuously sends route update messages to the base station controller. These route update messages help the wireless device to maintain the radio link with the base station controller and also allow the base station controller to track the location of the wireless device. The route update messages may be sent according to Route Update Protocol.

After the wireless device moves from one sector to another sector, the wireless device sends a route update message to the BSC. The change of sector is detected by the wireless device after a change in information received through broadcast messages received from the BSC. In one configuration, after receiving the route update message from the wireless device, the BSC notifies the PDSN about the location update by sending an extended A11 signaling message. The PDSN determines the identity of the registered LAS and forwards the location update information to the registered LAS. The LAS has the parameters for the wireless device and the LAS can identify the application server serving the wireless device. The LAS 202 then sends a location update message to the identified application server 112.

When the wireless device moves from one sector to another sector, the sector that the BSC 104 is leaving and the sector that the BSC 104 is moving into may belong to the same cell site. The sectors may also belong to different cell sites but be served by the same BSC 104. The sectors may also belong to different cell sites served by different BSCs. If the new BSC is being serviced by the same PDSN 107, in one configuration, an A10/A11 connection will be re-established between the PDSN and the new BSC, but the IP address previously assigned to the wireless device 102 and the PPP end-point will stay the same (as the PDSN has not changed). After moving to the new sector, the new BSC will send location update messages to the PDSN just like the old BSC. If the new BSC is serviced by a different PDSN, the entire PPP session will be torn down with the old PDSN, and the wireless device will establish a new PPP session with a new PDSN, and the A10/A11 connection will also be established. After the new PPP session is established, the wireless device will do a "rediscovery" of the LAS and register the application server to which the location update messages need to be sent.

In an alternative configuration, where the LAS 202 is co-located with the PDSN 107, the wireless device determines the LAS' address through an SRV look up and the wireless device proceeds to register with the LAS co-located with the PDSN using the LCP/NCP protocols or by forcing a PPP re-negotiation. After the wireless device moves from one sector to another sector, the wireless device sends a route update message to the BSC. The change of sector is detected by the wireless device 102 alter a change in information received through broadcast messages received from the BSC 104. After receiving the route update message from the wireless device, the BSC notifies the PDSN about the location update by sending an extended A11 signaling message. The A11 signaling message is received by the PDSN and the information about the location update is extracted from the signaling message and made available to the co-located LAS. The LAS has the parameters for the wireless device and the LAS can identify the application server serving the wireless device. The LAS then sends a location update message to the identified application server 112.

Although the invention is described above in a PTT environment, the invention is not limited to PTT communications. In a broader sense, the system and methods optimize communication between a wireless device and a base station controller. In view of the method being executable on a base station controller's computer device, the method can be performed by a program resident in a computer readable medium, where the program directs a server or other computer device having a computer platform to perform the steps of the method. The computer readable medium can be the memory of the server, or can be in a connective database. Further, the computer readable medium can be in a secondary storage media that is loadable onto a wireless communications device computer platform, such as a magnetic disk or tape, optical disk, hard disk, flash memory, or other storage media as is known in the art.

In the context of FIGS. 4-5, the method may be implemented, for example, by operating portion(s) of the wireless network, such as a wireless communications device or the server, to execute a sequence of machine-readable instructions. Though the steps are illustrated in sequence, the method may be implemented in difference sequence or as an event driven process.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the invention has been particularly shown and described with reference to a preferred embodiment thereof, it will be understood by those skilled in the art that various changes in form and detail may be made without departing from the scope of the present invention as set forth in the following claims. For example, the description above is based on an audio PTT communication, and it should be understood that the apparatus, system, and method can be easily modified to support other type of media, such as video, data, etc. Furthermore, although elements of the invention may be described or claimed in the singular, the plural is contemplated unless limitation to the singular is explicitly stated.

What is claimed is:

1. A method for updating location information of a wireless communication device in a wireless communication network, comprising:
   receiving a message;
   determining, from the message, a location information for the wireless communication device;
   comparing the retrieved location information with a stored location information for the wireless communication device; and
   upon detecting that the retrieved location information is different from the stored location information, transmitting the retrieved location information for the wireless communication device to an application server.

2. The method of claim 1, wherein receiving the message is prior to the setup of a traffic channel for the wireless communication device.

3. The method of claim 1, wherein the message is a Route Update message.

4. The method of claim 1, wherein the location information is inferred using the identity of the sector that most recently forwarded the message on behalf of the wireless communication device.

5. The method of claim 1, wherein transmitting the retrieved location information further comprises:
   transmitting a notification of location change message to a network server;
   composing the notification of location change message into a signaling message at the network server; and
   transmitting the signaling message from the network server to the application server.

6. The method of claim 5, wherein transmitting the notification of location change message further comprises transmitting the notification of location change message through an A11 message.

7. An apparatus for transmitting location information of a wireless device received through a message over a wireless communication network to a network server, comprising:
   a network interface unit which receives the location information of a transmitting wireless device through the message and transmits the received location information to the network server;
   a storage unit which stores a previous location information of the transmitting wireless device; and
   a controller unit which compares the received location information with the previous location information and determines whether the transmitting wireless device has moved from one location to another location, the controller further configured to send the received location information in a notification of location change message to the network server upon detecting that the transmitting wireless device has moved from one location to another location.

8. The apparatus of claim 7, wherein the network interface unit further receives the message prior to the setup of a traffic channel for the wireless device.

9. The apparatus of claim 7, wherein the controller further is configured to send the received location information in an A11 message.

10. The apparatus of claim 7, wherein the network interface unit receives the location information through a Route Update message.

11. The apparatus of claim 7, wherein the location information is inferred using the identity of a sector that most recently forwarded the message on behalf of the wireless device.

12. The apparatus of claim 7, wherein the network server is further configured to receive a notification of location change message, compose the notification of location change message into a signaling message, and transmit the signaling message to the application server.

13. An apparatus for transmitting location information of a wireless device received through a message over a wireless communication network to a network server, comprising:
    means for receiving the location information of a transmitting wireless device through the message;
    means for transmitting the received location information to the network server;
    means for storing a previous location information of the transmitting wireless device; and
    means for comparing the received location information with the previous location information and determining whether the transmitting wireless device has moved from one location to another location, the means for comparing further configured to send the received location information in a notification of location change message to the network server upon detecting that the transmitting wireless device has moved from one location to another location.

14. The apparatus of claim 13, wherein the means for receiving is further configured to receive the message prior to the setup of a traffic channel for the wireless device.

15. The apparatus of claim 13, wherein the means for transmitting is further configured to send the received location information in an A11 message.

16. The apparatus of claim 13, wherein the received location information is received through a Route Update message.

17. The apparatus of claim 13, wherein the location information is inferred using the identity of the sector that most recently forwarded the message on behalf of the wireless device.

18. The apparatus of claim 13, further comprising means for receiving a notification of location change message at the network server, means for composing the notification of location change message into a signaling message, and means for transmitting the signaling message to the application server.

19. A computer program product, comprising:
    a non-transitory computer readable medium comprising:
    a set of instructions to receive a message;
    a set of instructions to determine, from the message, a location information for the at least one wireless device;
    a set of instructions to compare the retrieved location information with a stored location information for the at least one wireless communication device; and
    upon detecting that the retrieved location information is different from the stored location information, a set of instructions to transmit the retrieved location information for the at least one wireless communication device to an application server.

20. The computer program product of claim 19, wherein the message is received prior to the setup of a traffic channel for the wireless device.

21. The computer program product of claim 19, wherein the message is a Route Update message.

22. The computer program product of claim 19, where the location information is inferred using a set of instructions to identity a sector that most recently forwarded the message on behalf of the wireless device.

23. The computer program product of claim 19, further comprising:
    a set of the instructions to receive a notification of location change message at a network server;
    a set of the instructions to compose the notification of location change message into a signaling message at the network server; and
    a set of the instructions to transmit the signaling message from the network server to the application server.

* * * * *